United States Patent
Inoguchi et al.

(10) Patent No.: US 6,636,384 B2
(45) Date of Patent: Oct. 21, 2003

(54) ELECTROMAGNETIC LINEAR ACTUATOR COMPRISING A FIXED PORTION, A MOVABLE PORTION, AND A GUIDE HAVING DAMPERS DIRECTLY ATTACHED THERETO, AND A TAPE DRIVE USING THE ELECTROMAGNETIC LINEAR ACTUATOR

(75) Inventors: Hiromi Inoguchi, Tokyo (JP); Ikuichiro Nawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/027,004

(22) Filed: Dec. 20, 2001

(65) Prior Publication Data

US 2002/0080530 A1 Jun. 27, 2002

(30) Foreign Application Priority Data

Dec. 25, 2000 (JP) ........................................ 2000-392214

(51) Int. Cl.[7] ............................................. G11B 21/08
(52) U.S. Cl. ................................................... 360/261.1
(58) Field of Search ....................... 360/261.1; 369/244, 369/249, 219

(56) References Cited

U.S. PATENT DOCUMENTS 5,793,574 A    8/1998  Cranson et al.
5,862,014 A    1/1999  Nute
6,078,483 A  * 6/2000  Anderson ................. 360/261.1
6,333,838 B1 * 12/2001 Anderson ................. 360/261.1

FOREIGN PATENT DOCUMENTS

JP    2000-149491 A    5/2000

* cited by examiner

Primary Examiner—David Davis
(74) Attorney, Agent, or Firm—Frishauf, Holtz, Goodman & Chick, P.C.

(57) ABSTRACT

An electromagnetic linear actuator comprises a movable portion holding an object so that the object is movable up and down with respect to a fixed portion, a guide for constraining the movement of the movable portion except in upward and downward directions, and a base for mounting the guide. The guide comprises a cylindrical bushing fixed onto the base, a guide shaft having a lower end press-fitted into the bushing, and upper and lower dampers directly attached to upper and lower ends of the guide shaft by means of elasticity of the dampers, respectively, so as to limit a stroke of the movable portion and to absorb mechanical shock. Each of the upper and the lower dampers is preferably made of an elastic material such as rubber.

9 Claims, 8 Drawing Sheets

ELECTROMAGNETIC LINEAR ACTUATOR COMPRISING A FIXED PORTION, A MOVABLE PORTION, AND A GUIDE HAVING DAMPERS DIRECTLY ATTACHED THERETO, AND A TAPE DRIVE USING THE ELECTROMAGNETIC LINEAR ACTUATOR

BACKGROUND OF THE INVENTION

This invention relates to a tape drive for use in a linear tape storage system represented by DLT (Digital Linear Tape) or LTO (Linear Tape Open) and, in particular, to a linear actuator which can be used as a head feed mechanism for moving a magnetic head used in the tape drive.

A linear tape storage system of the type has been developed as a backup for a computer system. A variety of linear tape storage systems have heretofore been proposed. For example, a digital linear tape drive as the DLT is disclosed in U.S. Pat. No. 5,862,014.

The digital linear tape drive is adapted to receive a tape cartridge having a single supply reel. The digital linear tape drive includes a take-up reel in the interior thereof. When the tape cartridge is received in the tape drive, a magnetic tape is pulled out from the tape cartridge to be wound up around the take-up reel through a head guide assembly. The head guide assembly serves to guide to a magnetic head the magnetic tape pulled out from the tape cartridge. The magnetic head exchanges information to and from the tape.

As disclosed in U.S. Pat. No. 5,793,574 for example, a tape drive typically comprises a generally rectangular housing having a common base. The base has two spindle motors. The first spindle motor has a permanently mounted spool permanently mounted to the base to serve as a take-up reel. The spool is dimensioned to accept a magnetic tape streaming at a relatively high speed. The second spindle motor is adapted to receive a removable tape cartridge.

The removable tape cartridge is manually or automatically inserted into the drive via a slot formed on a housing of the drive. When the tape cartridge is inserted into the slot, the cartridge is engaged with the second spindle motor. Prior to rotation of the first and the second spindle motors, the tape cartridge is connected to the permanently mounted spool by means of a mechanical buckling mechanism. A number of guide rollers are positioned between the tape cartridge and the permanently mounted spool and guide the magnetic tape as it streams at a relatively high speed back and forth between the tape cartridge and the permanently mounted spool.

The tape drive further comprises a head assembly. The head assembly is positioned between the spool and the tape cartridge along a tape path defined by a plurality of rollers. During operation of the tape drive, the magnetic tape streams between the spool and the tape cartridge along the tape path, coming into close proximity to the head assembly during streaming. An example of the head assembly is disclosed in U.S. Pat. No. 5,793,574 mentioned above. On the other hand, Japanese Unexamined Patent Publication No. 2000-149491 (JP 2000-149491 A) discloses an example of the tape cartridge to be received in the digital linear tape drive.

In order to move the head assembly up and down in a widthwise direction of the magnetic tape, the tape drive further includes a head feed mechanism. For example, the head feed mechanism comprises a threaded shaft, i.e., a lead screw as disclosed in U.S. Pat. No. 5,793,574 mentioned above. By rotating the lead screw, the head assembly is linearly moved up and down. The head feed mechanism of the type is herein referred to as a "mechanical linear actuator".

In the mechanical linear actuator, position control of the head assembly is carried out by so-called open-loop control. Therefore, it is difficult to controllably bring the head assembly to a desired position with high accuracy.

In view of the above, the present inventors have proposed a head feed mechanism for moving a head assembly up and down by electromagnetic force. The head feed mechanism of the type will herein be referred to as an "electromagnetic linear actuator".

In the electromagnetic linear actuator, position control of the head assembly can easily be carried out by closed-loop (feedback) control. It is therefore possible to controllably bring the head assembly to a desired position with high accuracy.

Upon production of the electromagnetic linear actuator, it is desired that the number of components and the number of assembling steps are small.

SUMMARY OF THE INVENTION

It is therefore an object of this invention to provide an electromagnetic linear actuator which is reduced in number of components and in number of assembling steps.

It is another object of this invention to provide a tape drive comprising the above-mentioned electromagnetic linear actuator.

Other objects of the present invention will become clear as the description proceeds.

According to an aspect of the present invention, there is provided an electromagnetic linear actuator which comprises a fixed portion, a movable portion holding an object, and a guide coupled to said fixed portion and said movable portion for guiding said movable portion to be movable with respect to said fixed portion only in a predetermined direction. The guide comprises a guide shaft fixed to said fixed portion and extending in said predetermined direction, said guide shaft having a first and a second portion which are apart from each other in said predetermined direction, a bearing connected to said movable portion and coupled to said guide shaft so as to be slidable along said guide shaft, and a first and a second damper having elasticity and directly attached to said first and said second portions of the guide shaft by said elasticity, respectively. The first and said second dampers limit a stroke of said movable portion and absorb mechanical shock of said movable portion.

According to another aspect of the present invention, there is provided a tape drive comprising the above-mentioned electromagnetic linear actuator and a head assembly as said object held by said movable portion.

DESCRIPTION OF THE PREFERRED EMBODIMENT

Figure 1:
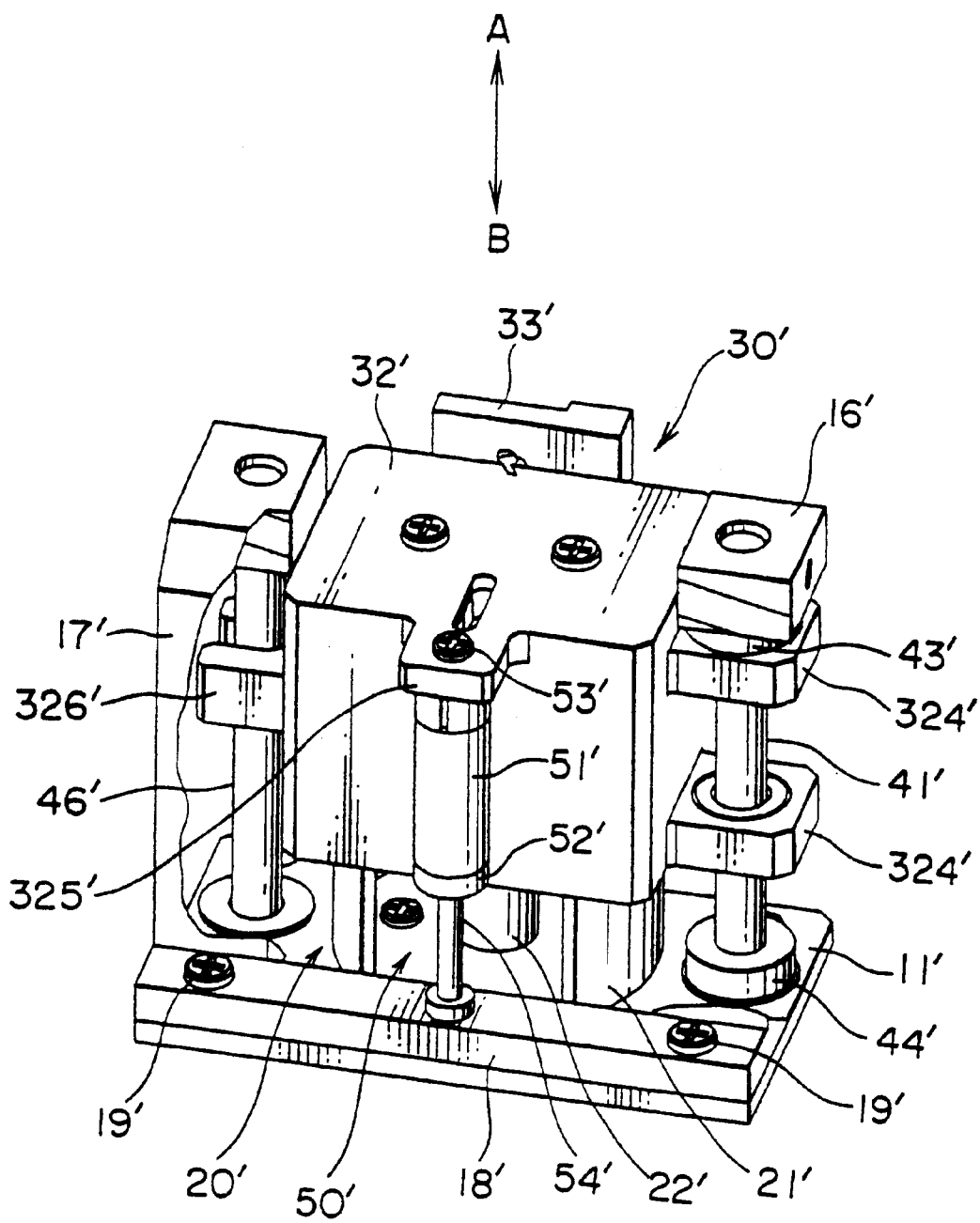
FIG. 1 is a partially cut-away perspective view of an electromagnetic linear actuator obtained in the course of the work leading to this invention as seen from a rear side.
Figure 2:
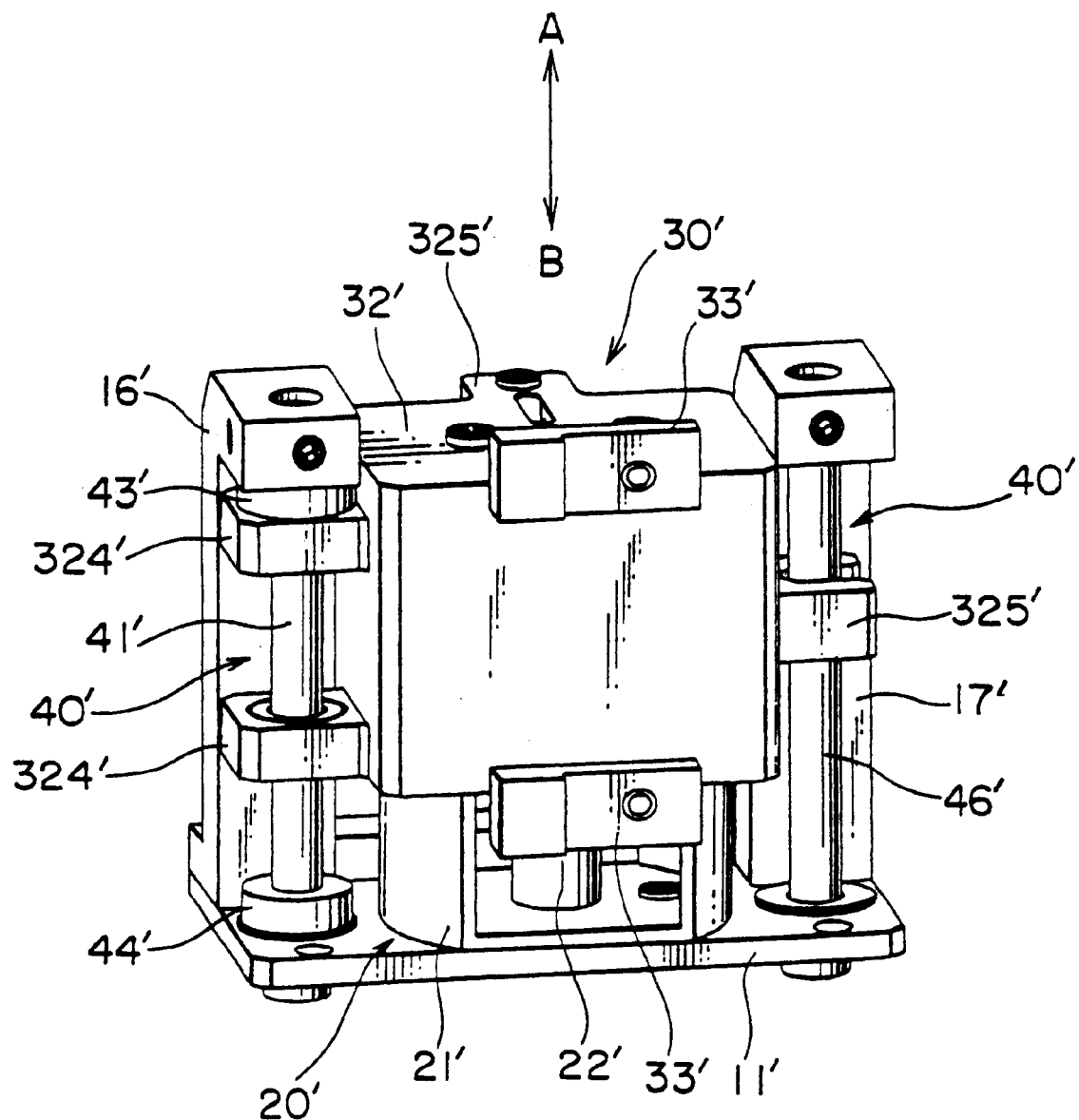
FIG. 2 is a perspective view of the electromagnetic linear actuator illustrated in FIG. 1 as seen from a front side.

At first referring to FIGS. 1 and 2, description will be made of an electromagnetic linear actuator obtained in the course of the work leading to this invention.

The electromagnetic linear actuator illustrated in the figure comprises a fixed portion 20', a movable portion 30' holding a head assembly (not shown) so that the head assembly is movable up and down with respect to the fixed portion 20', a guide 40' for constraining the movement of the movable portion 30' except up-and-down movement, and a base 11' for mounting the guide 40', and a position sensor 50' for detecting a current position of the movable portion 30' with respect to the fixed portion 20'. The fixed portion 20' includes a peripheral yoke 21' fixedly mounted to the base 11' by screws and a center yoke 22' standing at the center of the peripheral yoke 21'. The movable portion 30' has a box-like bracket 32' extending in upward and downward directions A and B to cover the peripheral yoke 21'.

The bracket 32' has a front surface provided with a pair of upper and lower holding members 33' for holding the above-mentioned head assembly. The bracket 32' has a rear surface provided with a protruding potion 325' protruding from its upper end to fix the position sensor 50' (which will later be described).

The guide 40' comprises first and second guide shafts 41' and 46' disposed on both sides of the bracket 32' and extending from the base 11' in the upward direction A. The base 11' is provided with first and second stoppers 16' and 17' extending in the upward direction A. The first stopper 16' is arranged adjacent to one side surface of the bracket 32' at a position spaced from the first guide shaft 41' while the second stopper 17' is arranged adjacent to the other side surface of the bracket 32' at a position spaced from the second guide shaft 46'. The first guide shaft 41' has a lower end attached to the base 11' and an upper end attached to an end portion of the first stopper 16'. On the other hand, the second guide shaft 46' has a lower end attached to the base 11' and an upper end attached to an end portion of the second stopper 17'.

The first guide shaft 41' is coupled to a pair of ring bearings 324' protruding from the one side surface of the bracket 32' so that the ring bearings 324' are slidable in the upward and the downward directions A and B. On the other hand, the second guide shaft 46' is coupled to a U-shaped protrusion 326' protruding from the other side surface of the bracket 32' so that the protrusion 326' is slidable in the upward and the downward directions A and B. The first guide shaft 41' is exclusively used to move the movable portion 30' up and down while the second guide shaft 46' is exclusively used as a rotation stopper for inhibiting the rotation of the movable portion 30'.

The first guide shaft 41' is provided with first and second ring dampers 43' and 44' fitted thereto at positions adjacent to the upper and the lower ends thereof, respectively. The first and the second ring dampers 43' and 44' are called upper and lower dampers, respectively. The upper damper 43' is fixed to the end portion of the first stopper 16' by adhesion while the lower damper 44' is fixed to an upper surface (principal surface) of the base 11' by adhesion. The ring bearings 324' of the movable portion 30' are butted to the upper and the lower dampers 43' and 44' so that a stroke of the movable portion 30' is limited and mechanical shock is absorbed.

The position sensor 50' for detecting the current position of the movable portion 30' in the upward and the downward directions A and B is disposed on the rear side of the bracket 32' and extends from the base 11' in the upward direction A.

More specifically, the position sensor 50' comprises a hollow sensor bobbin 52' with a sensor coil 51' wound therearound, a screw 53' engaged with the sensor bobbin 52' to fix the sensor bobbin 52' to the protruding portion 325' of the bracket 32', and a sensor shaft 54' extending in the upward and the downward directions A and B and having one end fixed to the base 11' and the other end inserted into the sensor bobbin 52'. The sensor shaft 54' has an outer diameter substantially equal to an inner diameter of the sensor bobbin 52'. The position sensor 50' detects the amount or length of insertion of the sensor shaft 54' into the sensor bobbin 52' as the change in inductance value so that the current position of the movable portion 30' with respect to the base 11' (fixed portion 20') is detected as a detected position.

The first and the second stoppers 16' and 17' are bridged at their lower ends by a beam 18' fixed onto the base 11' by screws 19' on the rear side of the bracket 32'. One end of the sensor shaft 54' is fixed to an approximate center of the beam 18'.

In the above-mentioned electromagnetic linear actuator, the upper damper 43' is fixed to the end portion of the first stopper 16' by adhesion while the lower damper 44' is fixed to the upper surface (principal surface) of the base 11' by adhesion. Therefore, various parts, such as the first stopper 16' and the screws 19', are required to fix the dampers. Thus, the number of components and the number of assembling steps are inevitably increased.

Figure 3:
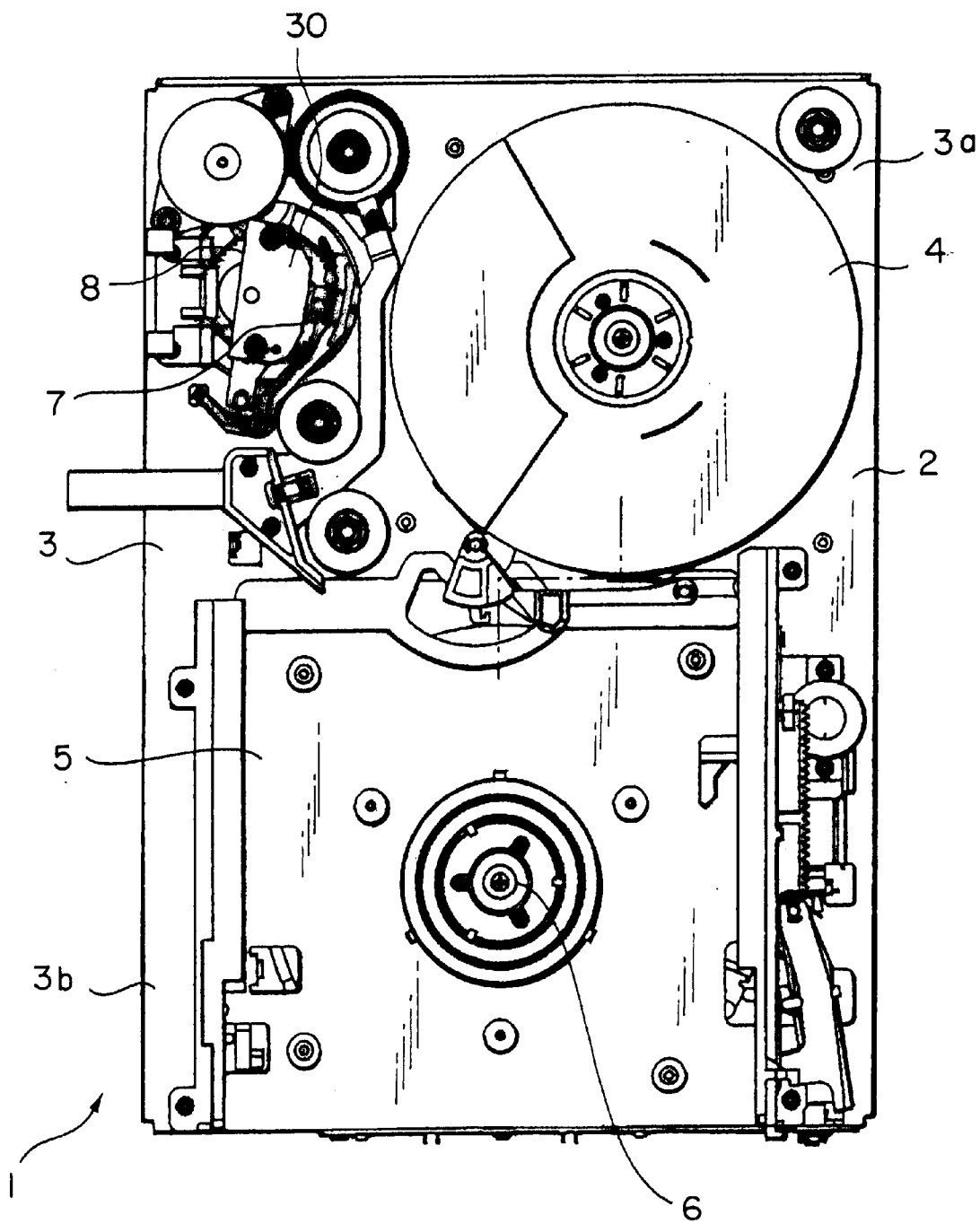
FIG. 3 is a plan view of a tape drive comprising an electromagnetic linear actuator according to a first embodiment of this invention.

Referring to FIG. 3, description will be made of a tape drive comprising an electromagnetic linear actuator according to a first embodiment of this invention.

The tape drive is depicted by a reference numeral 1 and includes a chassis 2 having an upper surface 3 and a lower surface opposite to the upper surface 3. The chassis 2 comprises a sheet metal chassis made of an ironbased magnetic material. The upper surface 3 is divided into first and second upper regions 3a and 3b. The tape drive further comprises a take-up reel 4 rotatably mounted to the chassis 2 on the first upper region 3a. The take-up reel 4 is driven and rotated by a take-up motor (not shown) attached to the chassis 2 on the lower surface.

A slot portion 5 is formed on the second upper region 3b of the upper surface 3 of the chassis 2. The slot portion 5 is adapted to receive a tape cartridge (not shown) comprising a rotatable supply reel (not shown). In the slot portion 5, a supply rotor 6 to be engaged with the supply reel of the tape cartridge is exposed. The supply rotor 6 is driven and rotated by a supply motor (not shown) attached to the chassis 2 on the lower surface.

The tape drive illustrated in the figure further includes a head assembly 7 having a magnetic head. The head assembly 7 is positioned on a tape path defined by a plurality of rollers. During operation of the tape drive, a magnetic tape streams between the take-up reel 4 and the tape cartridge along the tape path, coming into close proximity to the head assembly 7 during streaming. Thus, information exchange between the magnetic head and the magnetic tape can be carried out.

In order to move the head assembly 7 in a widthwise direction of the magnetic tape, i.e., in a direction perpendicular to a sheet plane of the drawing, the tape drive further includes a head feed mechanism 8. The head assembly 7 corresponds to an object to be moved up and down.

Figure 4:
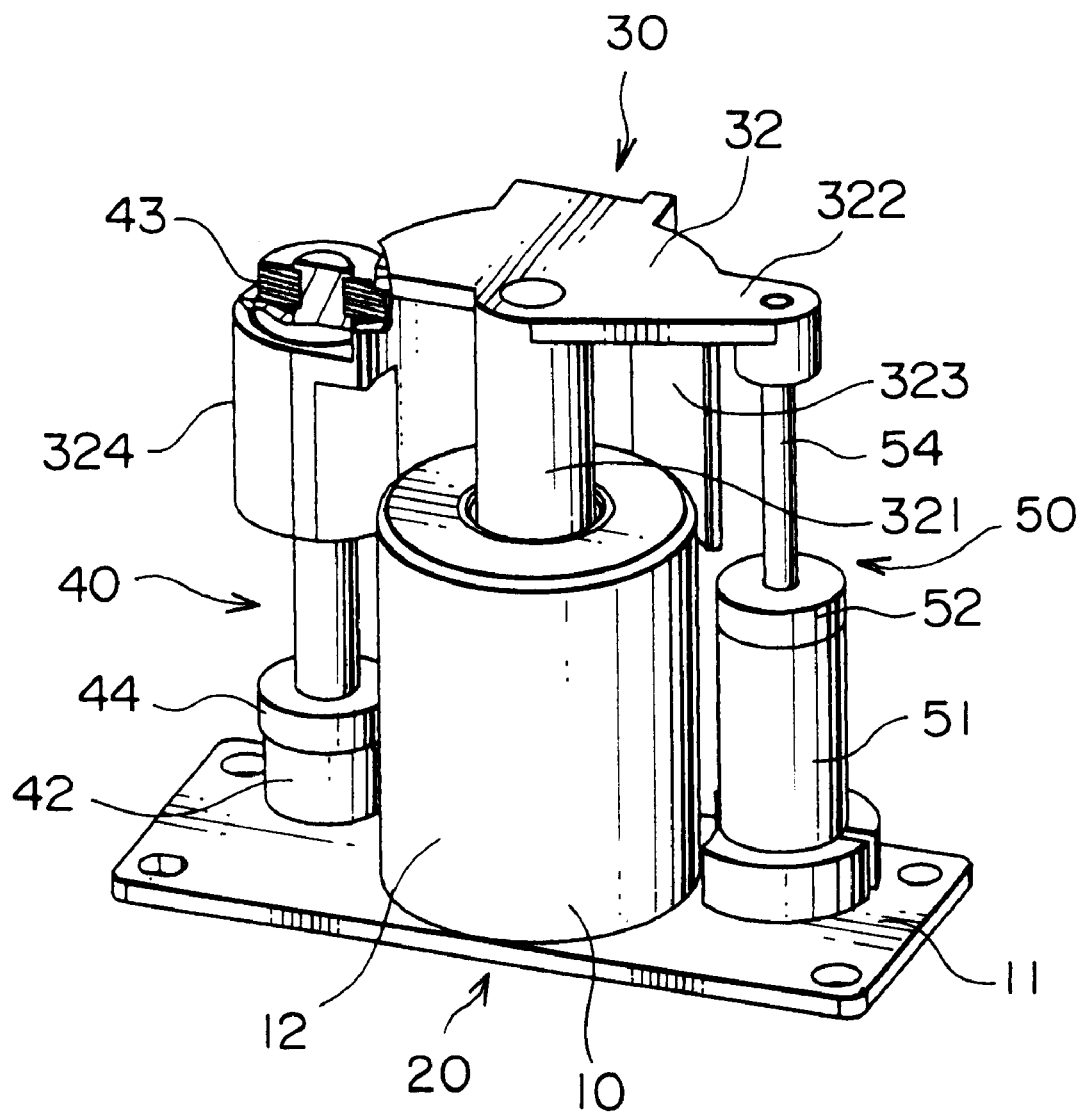
FIG. 4 is a perspective view showing the electromagnetic linear actuator in the tape drive illustrated in FIG. 3.
Figure 5:
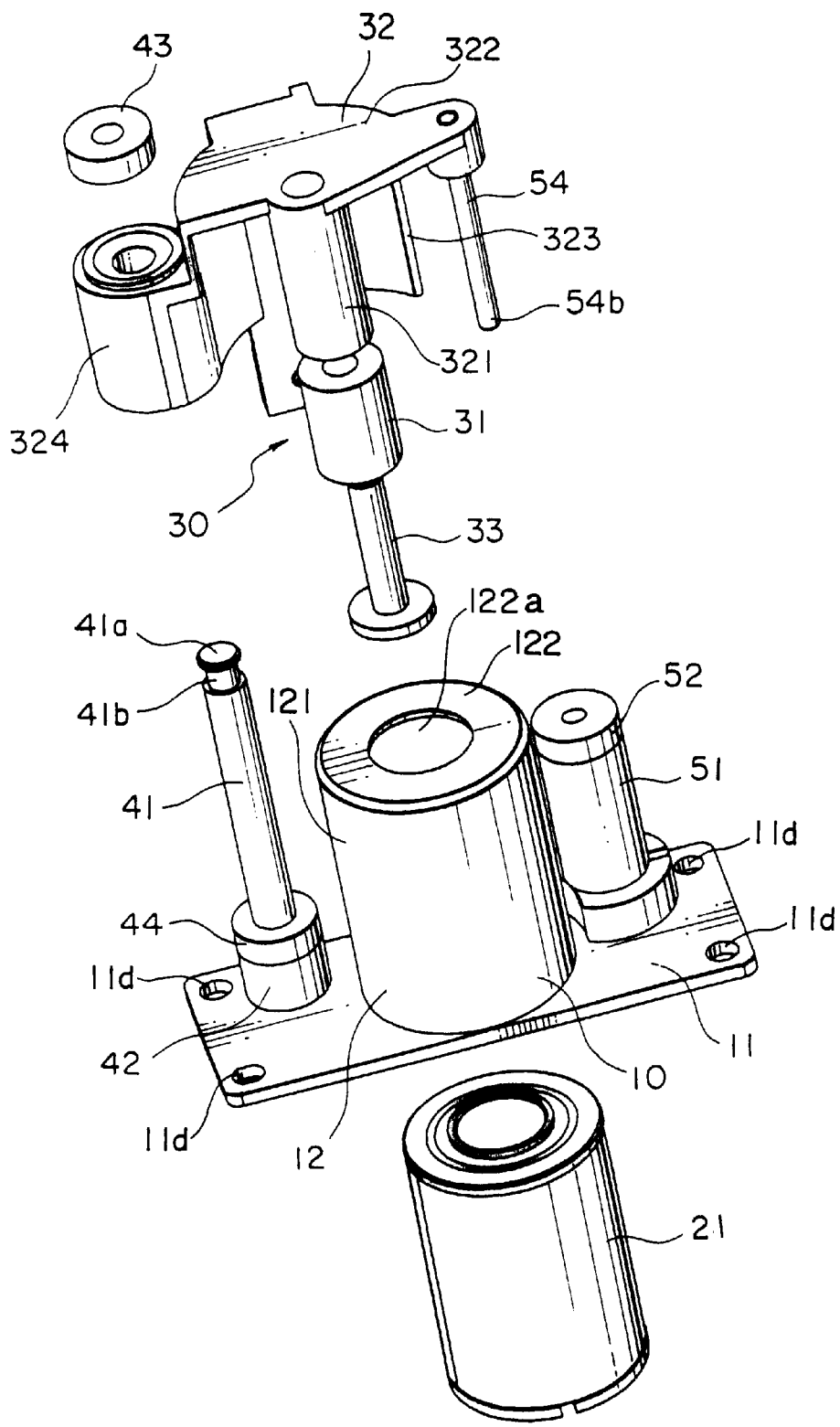
FIG. 5 is an exploded perspective view of the electromagnetic linear actuator illustrated in FIG. 4.
Figure 6:
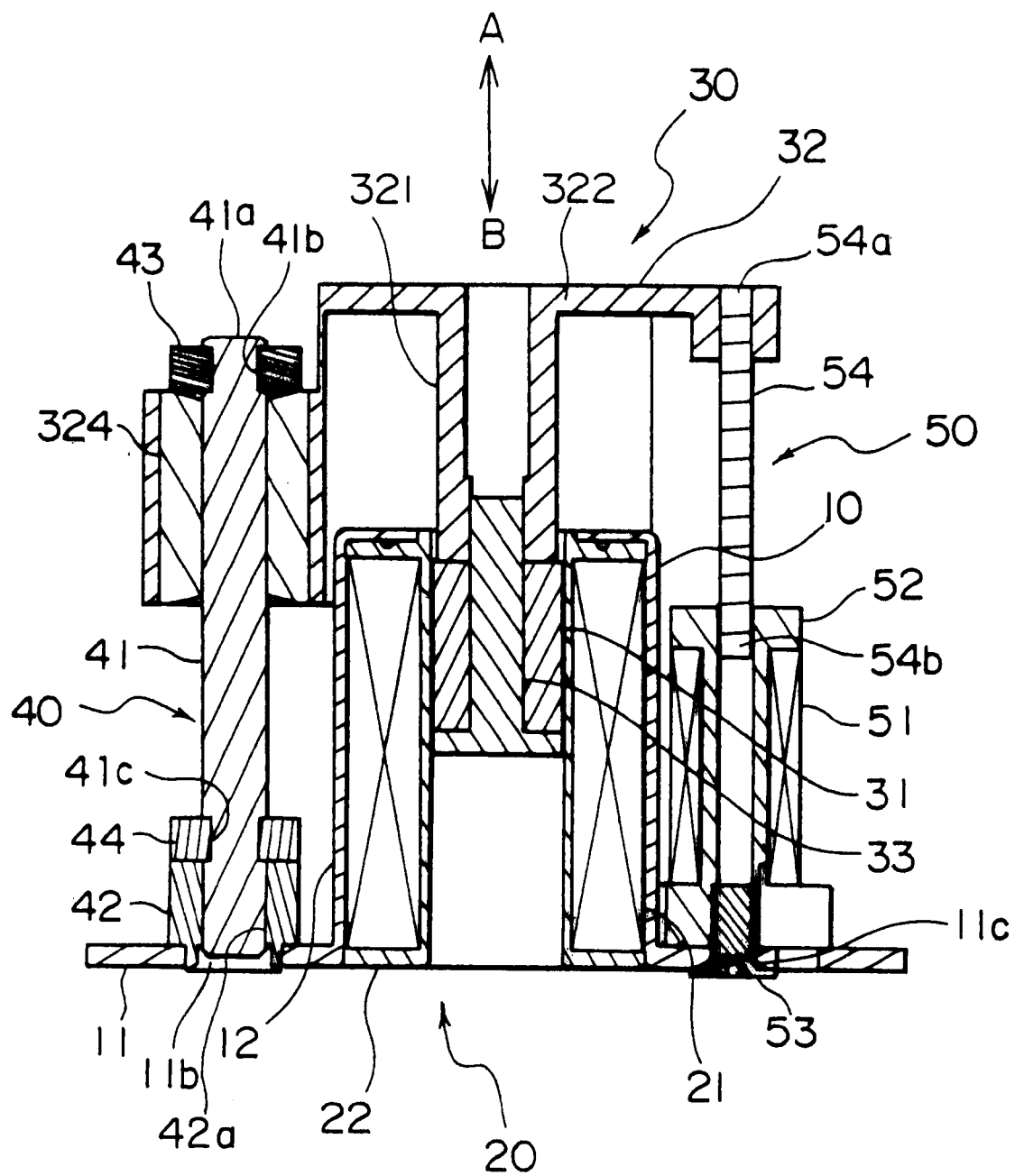
FIG. 6 is a sectional view of the electromagnetic linear actuator illustrated in FIG. 4.

Referring to FIGS. 4 through 6 in addition to FIG. 3, description will be made of the head feed mechanism 8.

The head feed mechanism 8 comprises an electromagnetic linear actuator of a "movable magnet type". The electromagnetic linear actuator comprises a fixed portion 20, a movable portion 30 holding the head assembly 7 and movable in upward and downward directions A and B with respect to the fixed portion 20, a guide 40 for guiding the movable portion 30 with inhibiting the movement thereof except up-and-down movement, and a position sensor 50.

The fixed portion 20 has a yoke base 10 of an integral formed product which comprises a plate-like base 11 and a cylindrical yoke 12 integrally formed. The yoke base 10 is formed by drawing a plate as the base 11 to form a portion having a cylindrical shape.

The base 11 is provided with a guide attaching hole 11b and a sensor attaching hole 11c. The guide 40 is attached to the guide attaching hole 11b of the base 11. The position sensor 50 is attached to the sensor attaching hole 11c. The base 11 is further provided with four through holes 11d at four corner portions thereof. The base 11 is attached to the chassis 2 of the tape drive 1 by inserting four screws (not shown) into the through holes 11d.

The yoke 12 has a cylindrical portion 121 and an annular upper surface portion 122 arranged at an upper end of the cylindrical portion 121 and having a circular opening 122a formed at its center. The yoke 12 contains a hollow bobbin 22 with a coil 21 wound therearound.

On the other hand, the movable portion 30 comprises a cylindrical magnet 31 extending in the upward and the downward directions A and B, a bracket 32 mounted on the magnet 31, and a center yoke 33 inserted into the magnet 31 to connect the magnet 31 and the bracket 32. The magnet 31 is received in the bobbin 22 to be slidable in the upward and the downward directions A and B. The magnet 31 has an outer diameter substantially equal to the inner diameter of the bobbin 22. A combination of the yoke 12, the coil 21, the magnet, 31, and the center yoke 33 is referred to as an electromagnetic device which generates electromagnetic power acting between the coil 21 and the magnet 31 when the coil 21 is supplied with an electric current in the manner known in the art.

The bracket 32 has a cylindrical portion 321 standing on the magnet 31 and extending in the upward direction A, a sector portion 322 disposed at an upper end of the cylindrical portion 321 and extending outward in a radial direction perpendicular to the upward and the downward directions A and B, and a curved portion 323 disposed at an outer peripheral edge of the sector portion 322 and extending in the downward direction B in parallel to the cylindrical portion 321. The head assembly 7 is attached to the curved portion 323.

The guide 40 comprises a guide shaft 41 attached to the base 11 and extending on a guide attaching hole 11b in the upward direction A, and a cylindrical bushing 42 disposed at a lower end of the guide shaft 41 and fitted to the guide attaching hole 11b to thereby attach the guide shaft 41 to the base 11 on the guide attaching hole 11b. The cylindrical bushing 42 has a cylindrical bushing hole 42a. The guide shaft 41 has an end which is fixed to said cylindrical bushing 42 by being press-fitted into cylindrical bushing hole 42a. A cylindrical bearing 324 protrudes from one lateral end of the curved portion 323 of the bracket 32 outward in the radial direction and is attached to the guide shaft 41 to be slidable in the upward and the downward directions A and B.

The guide shaft 41 has a top end 41a in the upward direction A, a first ring groove 41b formed adjacent to the top end 41a, and a second ring groove 41c formed adjacent to the bushing 42 in the downward direction B on an upper side thereof. A first ring damper (upper damper) 43 is fitted to the first ring groove 41b while a second ring damper (lower damper) 44 is fitted to the second ring groove 41c. Specifically, each of the upper and the lower dampers 43 and 44 is made of an elastic material, such as rubber, and is directly attached to the guide shaft 41 by means of its elasticity. Therefore, the bearing 324 is slidable between the upper and the lower dampers 43 and 44 along the guide shaft 41 in the upward and the downward directions A and B. In other words, the bearing 324 is butted to the upper and the lower dampers 43 and 44 so that a stroke of the movable portion 30 is limited and mechanical shock is absorbed.

As described above, each of the upper and the lower dampers 43 and 44 is directly attached to the guide shaft 41 by means of its elasticity. Therefore, it is possible to dispense with various parts, such as the first stopper 16' and the screws 19' which are required to fix the dampers in the electromagnetic linear actuator illustrated in FIGS. 1 and 2.

On the other hand, the position sensor 50 is attached to the base 11 and extends on the sensor attaching hole 11c in the upward direction A.

More specifically, the position sensor 50 comprises a hollow sensor bobbin 52 with a sensor coil 51 wound therearound, a screw 53 engaged with the sensor bobbin 52 through the sensor attaching hole 11c so that the sensor bobbin 52 is attached to the base 11 to stand on the sensor attaching hole 11 in the upward direction A, and a sensor shaft 54 extending in the upward and the downward directions A and B. The sensor shaft 54 has one end 54a fixed to the sector portion 322 at an upper position corresponding to the sensor attaching hole 11c and the other end 54b inserted into the sensor bobbin 52. The sensor shaft 54 has an outer diameter substantially equal to an inner diameter of the sensor bobbin 52. The position sensor 50 detects the amount or length of insertion of the sensor shaft 54 into the sensor bobbin 52 as the change in inductance value so that the current position of the movable portion 30 with respect to the base 11 (fixed portion 20) is detected as a detected position.

The position sensor 50 produces a position detection signal representative of the current position, i.e., the detected position of the movable portion 30 and transmits the position detection signal to a controller (not shown). The controller compares the detected position represented by the position detection signal and a target position of the movable portion 30 and controls the electric current supplied to the coil 21 wound around the bobbin 22 so that the detected position is coincident with the target position. Thus, by the use of the electromagnetic linear actuator, position control of the head assembly (object to be moved up and down) 7 can be carried out by closed loop (feedback) control.

Figure 7:
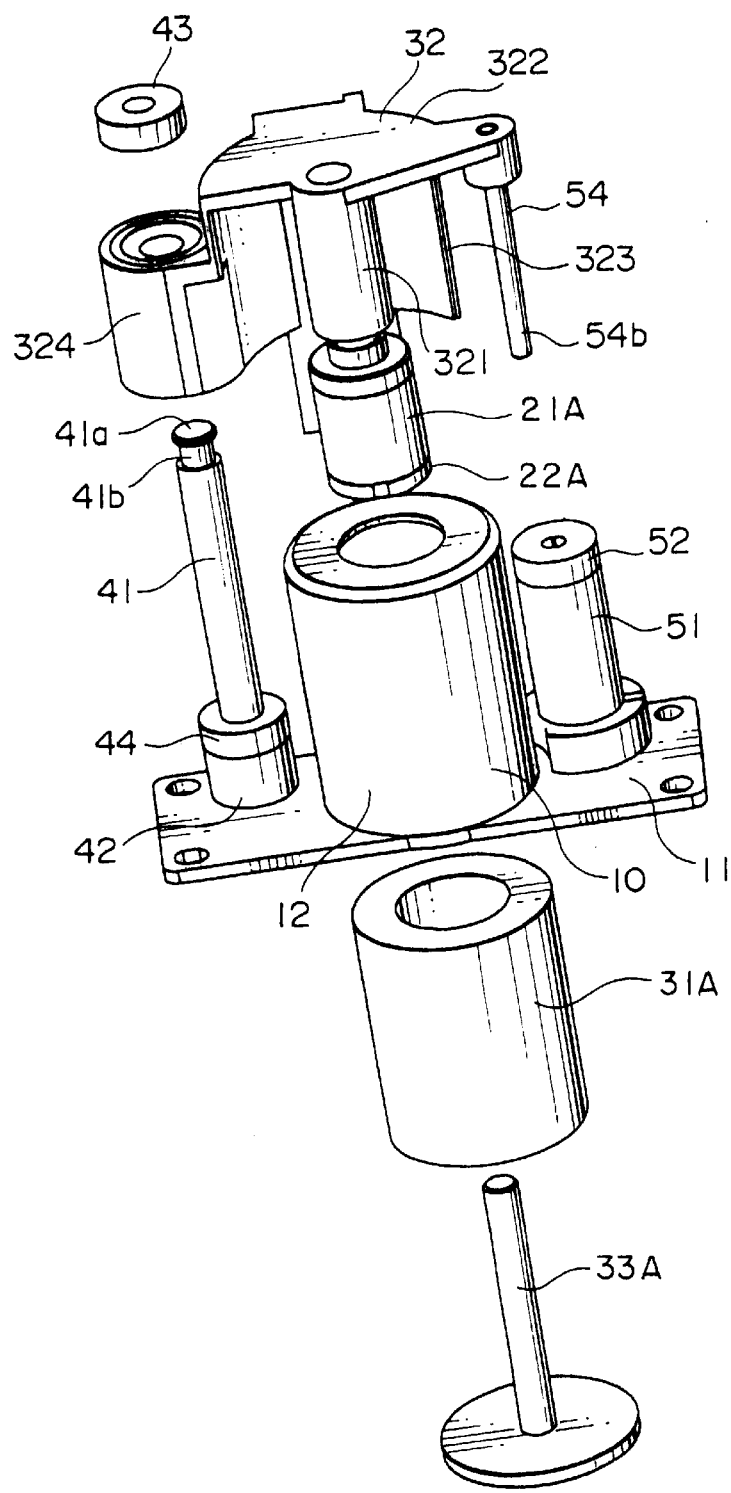
FIG. 7 is an exploded perspective view of an electromagnetic linear actuator according to a second embodiment of this invention.
Figure 8:
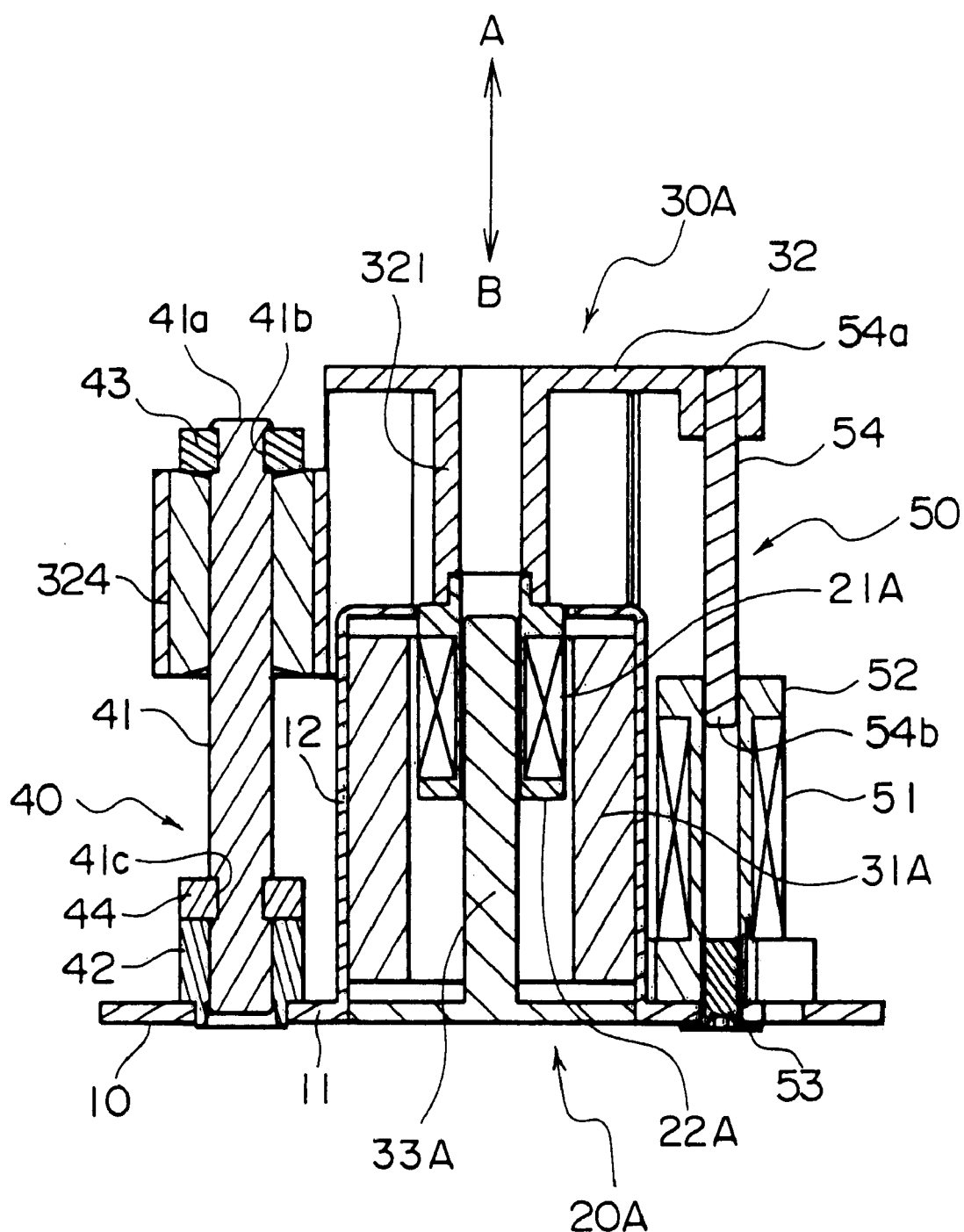
FIG. 8 is a sectional view of the electromagnetic linear actuator illustrated in FIG. 7.

Referring to FIGS. 7 and 8, description will be made of an electromagnetic linear actuator according to a second embodiment of this invention. The same parts as those of the electromagnetic linear actuator illustrated in FIGS. 4 through 6 are designated by the same reference numerals and description thereof will be omitted. Similar parts are designated by the same reference numerals with a suffix "A" added thereto.

The electromagnetic linear actuator illustrated in FIGS. 4 through 6 is of a "movable magnet type" in which the magnet is movable. On the other hand, the electromagnetic linear actuator illustrated in FIGS. 7 and 8 is of a "movable coil type" in which the coil is movable. The fixed portion 20A comprises a cylindrical magnet 31A received in the yoke 12, and a center yoke 33A fixed at a lower end of the yoke 12 and extending in the upward direction A. The movable portion 30A includes a hollow bobbin 22A disposed between the magnet 31A and the center yoke 33A and having a coil 21A wound therearound. The bobbin 22A is slidable in the upward and the downward directions A and B with respect to the center yoke 33A. The bobbin 22A has an inner diameter substantially equal to an outer diameter of the center yoke 33A.

Although this invention has thus far been described in conjunction with the preferred embodiments, it will readily be understood that this invention is not restricted thereto. For example, each of the dampers may be directly attached to the guide shaft by the use of an e-ring or an O-ring. In the foregoing embodiment, description is directed to the case where the object to be moved up and down is the head assembly. However, the object is not restricted thereto at all.

What is claimed is:

1. An electromagnetic linear actuator comprising:
    a fixed portion;
    a movable portion holding an object; and
    a guide coupled to said fixed portion and said movable portion for guiding said movable portion to be movable with respect to said fixed portion only in a predetermined direction,
    said guide comprising:
        a guide shaft fixed to said fixed portion and extending in said predetermined direction, said guide shaft having a first and a second portion which are apart from each other in said predetermined direction;
        a bearing connected to said movable portion and coupled to said guide shaft so as to be slidable along said guide shaft; and
        a first and a second damper having elasticity and directly attached to said first and said second portions of the guide shaft by said elasticity, respectively, said first and said second dampers limiting a stroke of said movable portion and absorbing mechanical shock of said movable portion.

2. The electromagnetic linear actuator according to claim 1, wherein said fixed portion comprises:
    a base extending perpendicular to said predetermined direction; and
    a bushing fixed onto said base, said guide shaft having an end which is fixed to said bushing.

3. The electromagnetic linear actuator according to claim 2, wherein said bushing has a bushing hole, said first end of the guide shaft being press-fitted into said bushing hole.

4. The electromagnetic linear actuator according to claim 2, wherein said base has an attaching hole, said bushing being press-fitted into said attaching hole.

5. The electromagnetic linear actuator according to claim 1, wherein each of said first and said second dampers is made of an elastic material.

6. The electromagnetic linear actuator according to claim 5, wherein said elastic material is rubber.

7. The electromagnetic linear actuator according to claim 5, wherein said guide shaft has first and second ring grooves provided at said first and said second portions, respectively, and said first and said second dampers have a ring shape and are fitted in said first and said second ring grooves, respectively.

8. The electromagnetic linear actuator according to claim 1, wherein one of said fixed portion and said movable portion comprises a magnet, another of said fixed portion and said movable portion comprising a coil electromagnetically coupled to said magnet, a combination of said magnet and said coil serving as an electromagnetic device for generating electromagnetic power acting between said magnet and said coil when said coil is supplied with an electric current.

9. A tape drive comprising:
    the electromagnetic linear actuator according to claim 1; and
    a head assembly as said object held by said movable portion.

* * * * *